United States Patent [19]

Miyamoto et al.

[11] Patent Number: 5,292,398
[45] Date of Patent: Mar. 8, 1994

[54] APPARATUS FOR JOINING A TREAD IN A MACHINE FOR MAKING A TIRE

[75] Inventors: Yoshinori Miyamoto; Jiro Agawa; Hidemasa Sato, all of Nagasaki, Japan

[73] Assignee: Mitsubishi Jukogyo Kabushiki Kaisha, Tokyo, Japan

[21] Appl. No.: 970,238

[22] Filed: Nov. 2, 1992

Related U.S. Application Data

[62] Division of Ser. No. 612,142, Nov. 13, 1990, abandoned.

[30] Foreign Application Priority Data

Nov. 13, 1989 [JP] Japan .................................. 1-292418
Aug. 6, 1990 [JP] Japan .................................. 2-206733

[51] Int. Cl.$^5$ ............................................. B29D 30/30
[52] U.S. Cl. ................................. 156/405.1; 156/130; 156/360; 156/406.1
[58] Field of Search .................. 156/128.1, 128.6, 123, 156/129, 130, 405.1, 406.4, 406.6, 64, 360, 362; 198/817, 836.1

[56] References Cited

U.S. PATENT DOCUMENTS

| 1,315,981 | 9/1919 | Morton | 156/406.6 |
| 3,537,936 | 11/1970 | Leblond | 156/405.1 |
| 3,847,705 | 11/1974 | Habert et al. | 156/129 X |
| 3,874,974 | 4/1975 | Simmons, Jr. | 156/130 X |
| 4,470,866 | 9/1984 | Satoh et al. | 156/406.6 |
| 4,474,338 | 10/1984 | Hirano et al. | 156/123 X |
| 4,804,426 | 2/1989 | Okuyama et al. | 156/128.1 |
| 4,820,373 | 4/1989 | Klose | 156/405.1 |

FOREIGN PATENT DOCUMENTS

| 164709 | 12/1985 | European Pat. Off. | 156/128.1 |
| 0201653 | 11/1986 | European Pat. Off. | |
| 880783 | 11/1981 | U.S.S.R. | 156/126 |

*Primary Examiner*—Geoffrey L. Knable
*Attorney, Agent, or Firm*—Wenderoth, Lind & Ponack

[57] ABSTRACT

An apparatus joins opposite ends of a tread on a rotary drum in a tire making machine. Besides the rotary drum, the apparatus includes a conveyor having two lateral endless loops and a guide in the form of rollers interposed between the loops. The conveyor is disposed upstream of the rotary drum. Clamping mechanisms are provided to clamp the respective sides of the tread at a rear end thereof to the endless loops of the conveyor, respectively. A tread placed on the endless loops of the conveyor is maintained in relative position by the guide. The actual length of the tread on the conveyor is measured. The front end of the tread is adhered to the rotary drum and the opposite sides of the tread at the rear end thereof are clamped to the conveyor. The conveyor and drum are then driven at appropriate speeds based on the length of the tread to cause the ends thereof to be joined on the drum. Movable grippers can be provided to stretch the rear end of the tread at the sides thereof into abutment with the front end.

9 Claims, 6 Drawing Sheets

APPARATUS FOR JOINING A TREAD IN A MACHINE FOR MAKING A TIRE

This application is a divisional of now abandoned application, Ser. No. 07/612,142, filed Nov. 13, 1990, now abandoned.

BACKGROUND OF THE INVENTION

1. Field of the Invention

The present invention relates to a apparatus for joining opposite ends of a strip of tread in a machine for making a tire.

2. Description of the Prior Art

Treads are cut to a length each corresponding to the circumference of a tire. The length of such treads may vary depending not only on how accurately they are cut, but also on mixing conditions, the period between an extrusion process and a molding process, and temperature or other conditions. A tolerance of a part of the tire in which opposite ends of each tread is joined is quite small for achieving better performance of the tire.

(1) A conventional apparatus for joining the ends of a tread includes no effective means for altering or adjusting the length of a tread. To this end, an operator must manually adjust it by himself in the process of joining the ends of the tread.

(2) There has been proposed a method for joining opposite ends of a tread by adjusting the speed of each of a conveyor and a tread drum to wrap the tread, as cut to a length equal to the circumference of a tire, around the drum.

(1) As earlier stated, the length of the treads as cut may vary depending not only on how accurately they are cut, but also on mixing conditions, the period between an extrusion process and a molding process, and temperature or other conditions. A tolerance for of a part of the tire in which opposite ends of each tread is joined is however quite small. The manual adjustment of the length of each tread by the operator suffers from the following problems:

a) Considerable skill is required;
b) It is a heavy work; and
c) It is not efficient, and the opposite ends of the tread are not always joined in an accurate fashion.

(2) A disadvantage with the method for joining opposite ends of a tread by adjusting the speed of each of a conveyor and a tread drum, so as to wrap the tread around the drum, is as follows.

Figure 15:
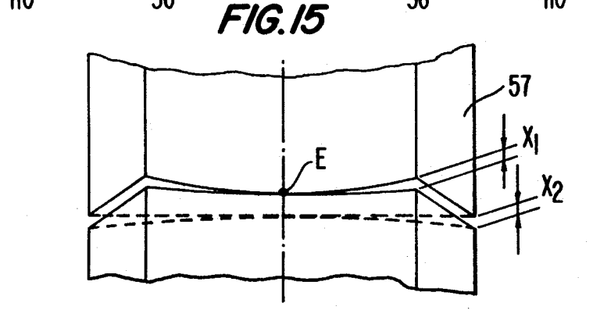
FIG. 15 is a diagrammatic view showing the manner in which front and rear ends of the tread are joined together.

As shown in FIG. 15, the speed of a conveyor and a tread drum is adjusted to wrap a tread 57 around the drum in such a manner as to bring the centers E of the front and rear ends of the tread 57 into alignment with each other. In such a case, between any portions of the tread 57 other than at the center E there is likely to be spaces $X_1$ and $X_2$. To this end, an operator must manually alter or adjust the rear end of the tread.

SUMMARY OF THE INVENTION

In the present invention:

(1) The actual length of a tread is first measured;
(2) The front end of the tread is adhesively attached to a given portion of a drum;
(3) The rear end of the tread is fixed to a conveyor, and the drum and conveyor are so driven as to bring the front end of the tread into alignment with the rear end of the tread; and (4) Upon driving the drum and the conveyor, the speed of rotation of the conveyor and the drum are adjusted as follows:

$$v = V \times \frac{l_1 - l_2}{L}$$

where L (mm) is the circumference of the drum, l1 (mm) is the actual length of the tread, l2 (mm) is the length of a skived end of the tread, V (mm/sec) is the speed of rotation of the drum, and v (mm/sec) is the speed of the conveyor.

Further, in the present invention, the front and rear ends of the tread are gripped after the actual length of the tread has been measured. A machine is used to stretch the rear end of the tread so as to join it to the front end of the tread.

The present invention operates as follows.

(1) The actual length of the tread is first measured. The front end of the tread is bonded to the drum, and the rear end of the tread is secured to the conveyor. The speed of rotation of the drum and the speed of the conveyor are adjusted in a manner as explained above. The tread is then wrapped around the drum while it is being stretched to a necessary extent. As a result, the opposite ends of the tread can be joined together with no space left therebetween.

(2) While the tread is being wrapped in a manner as set forth in the previous paragraph (1), the front and rear ends of the tread are gripped, and the rear end of the tread is so stretched as to eliminate the spaces $X_1$ and $X_2$. By altering the end of the tread in consideration of the materials of the tread, mixing conditions and shapes, the front and rear ends of the tread can be joined together without any space therebetween.

BRIEF DESCRIPTION OF THE DRAWINGS

A better understanding of the present invention may be had by referring to the following description of preferred embodiments when taken in conjunction with the accompanying drawings, in which.

DETAILED DESCRIPTION OF THE PREFERRED EMBODIMENTS

In FIGS. 1 to 10, reference numeral 1 designates a conveyor frame. Brackets 2 and 3 are provided at opposite ends of the conveyor frame 1. A plate 4 is slidable along the bracket 3. A pull screw 5 is threaded to the plate 4. Reference numeral 6 designates a press roller, 7 a pneumatic cylinder, and 8 a drive roller. Reference numerals 9, 10 and 12 designate idler rollers, and 11 a tension roller. A pivot pin 13 pivotally supports the press roller 6. Reference numeral 14 designates a slide bearing. Rails 15 are disposed on a support frame 53. Bearings 16 are provided on the upper ends of vertical members 24. Brackets 17 are provided at one end thereof on the support frame 53. Reference numeral 18 designates a motor for taking up a wire 51. Reference numeral 19 designates a conveyor drive motor. A screw 20 is adapted to adjustably vertically support the other end of the support frame 53. A bracket 21 extends from the upper portion of another vertical member 23. The vertical members 23 and 24 are supported on a base 22. Reference numerals 25 and 28 designate reflection type optical switches. An arm 26 extends upright on the conveyor frame 1, an arm 27 extends upright on a carrier 50, and fingers 29 extend from the upper ends of splined shafts 33. Reference numeral 30 designates blocks in which bearings 31 are arranged. The blocks 30 are moved up and down by pneumatic cylinders 32. The splined shafts 33 extend vertically from brackets 34 which are, in turn, attached to a carrier 55. Fingers 35 extend from the blocks 30. Reference numerals 36 designates a conveyor belt, and 37 guide rollers for guiding the conveyor belt 36. Reference numeral 38 designates plates of the conveyor frame 1, and 39 a rectangular pipe of the conveyor frame 1. The carrier 55 is provided with slide bearings 40. A pneumatic cylinder 41 is mounted to the support frame 53. Rails 42 are disposed on a table 56. A nut 43 is fixed to the carrier 50. A screw 44 is in threaded engagement with the nut 43. A motor 45 is driven to rotate the screw 44. The screw 44 is rotatably supported by a bearing 46. A bracket 47 extends from the carrier 50. Reference numeral 48 designates a forming drum. A stopper 49 is attached to the carrier 55, and the wire 51 is connected to the carrier 55. Pins 52 rotatably support the guide rollers 37. Reference numeral 54 designates an arm on which the press roller 6 is rotatably supported. The table 56 is formed by an extension of the support frame 53. Reference numeral 57 designates a tread. Rails 58 are mounted on the conveyor frame 1. And, slide bearings 59 of the carrier 50 are mounted on rails 42.

Figure 3:
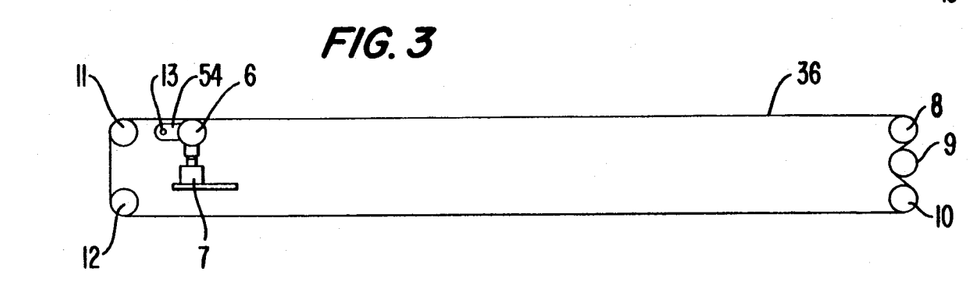
FIG. 3 is a sectional view taken along line B—B of FIG. 2.
Figure 4:
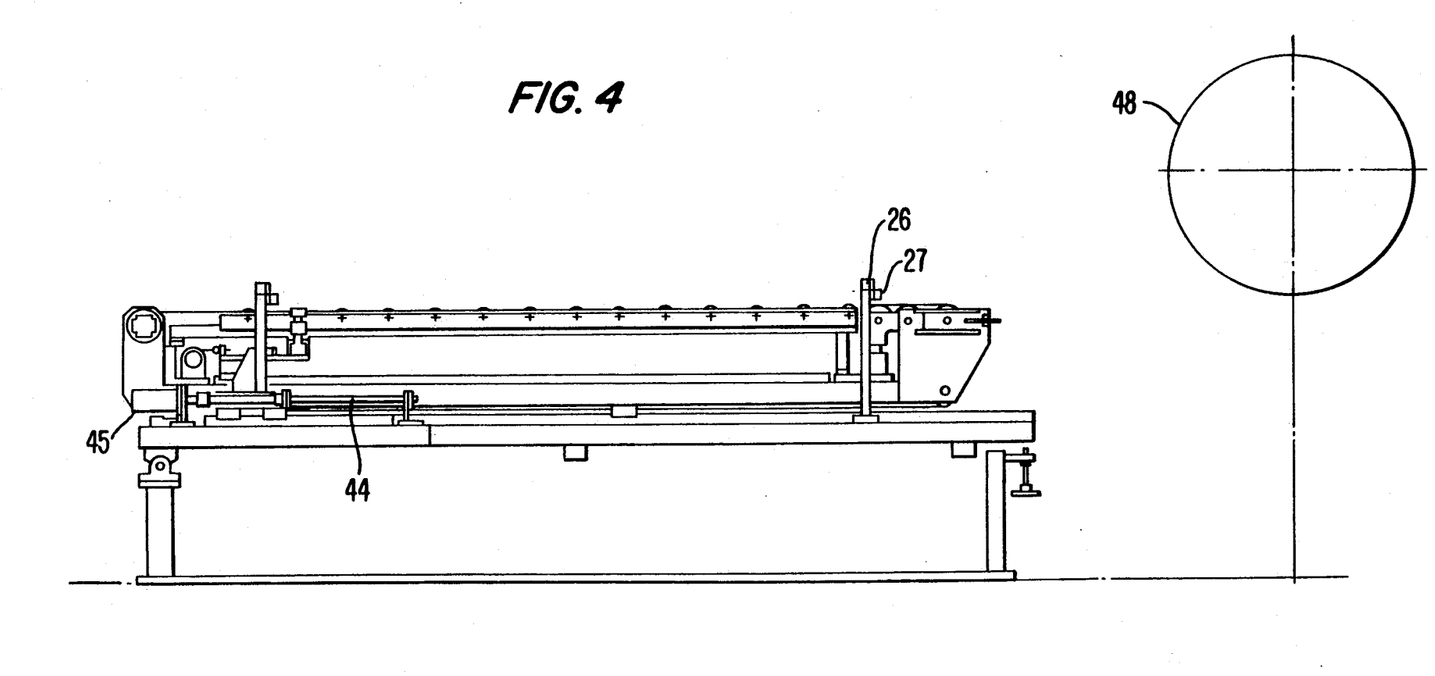
FIG. 4 is a side view of the apparatus, but looking in the opposite direction from FIG. 1.

The conveyor belt 36 shown in FIG. 3 as taken along the center line Y—Y of the apparatus, is trained around the idler rollers 11, 12, 10 and 9 and the drive roller 8. The drive roller 8 is connected to the motor 19, such as a servo motor, the speed of rotation of which is controllable. The idler roller 11 is moveable in a to-and-fro direction relative to the conveyor to adjust the tension of the conveyor belt 36. The forming drum 48 is located forwardly of the conveyor and is driven for rotation by a servo motor (not shown). At the front portion of the conveyor, the press roller 6 is rotatably supported by the arm 54 which is, in turn, pivotably supported by the conveyor frame 1 through the pivot pin 13. The arm 54 is also supported by the pneumatic cylinder 7 which is, in turn, mounted to the conveyor frame 1.

Figure 1:
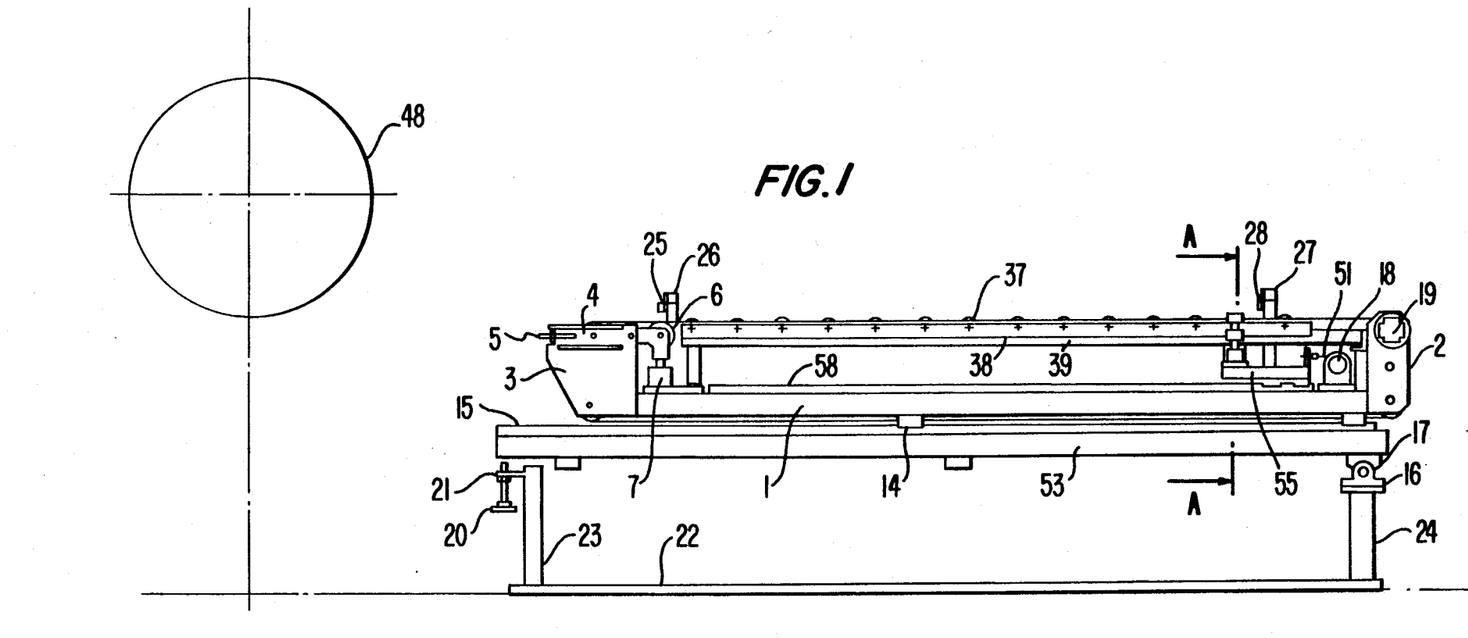
FIG. 1 is side view of an apparatus for joining tread ends, according to a first embodiment of the present invention.

Below the conveyor frame 1 are the slide bearings 14 slidably supported on the rails 15 which are fixedly mounted on the support frame 53. The pneumatic cylinder 41 is mounted to the support frame 53 and connected to the conveyor frame 1 so as to move the conveyor in a to-and-fro direction. The support frame 53 has a rear end rotatably supported by the bearing 16 and a front end vertically adjustable by the screw 20. The bearing 16 is mounted to the vertical member 24 which is, in turn, fixed to the base 22. The screw 20 is mounted through the bracket 21 to the vertical member 23 which is, in turn, fixed to the base 22.

Figure 2:
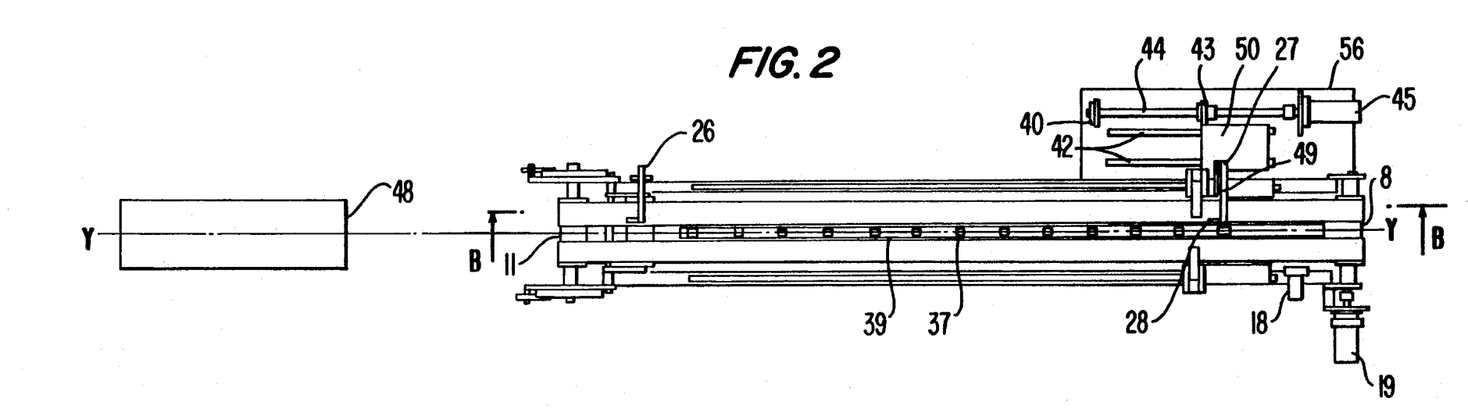
FIG. 2 is a top plan view of the apparatus shown in FIG. 1.

Mounted to the conveyor frame 1 are the rails 58 along which the carrier 55 is moveable through the slide bearings 40. The brackets 34 are fixed to opposite sides of the carrier 55. The splined shafts 33 extend from the respective brackets 34. The fingers 29 are mounted to the upper ends of the splined shafts 33. Also, the blocks 30 are slidable along the splined shafts 33 through the bearings 31, and the fingers 35 extend from the respective blocks 30. The pneumatic cylinders 32 are fixedly mounted to the brackets 34 and have rods connected to the blocks 30. The motor 18 is mounted to the conveyor frame 1 and has a shaft to which a cylindrical take-up drum (not shown) is mounted to take up the wire 51. One end of the wire 51 is attached to the carrier 55.

The table 56 extends from the support frame 53 and forms part thereof. Mounted to the table 56 are the rails 42 along which the carrier 50 is moveable through the bearings 59. The carrier 50 includes the arm 27, a forward end of which is provided with the reflection-type optical switch 28. The stopper 49 is mounted to the carrier 55 and when the carrier 55 is returned, the stopper is brought into contact with the arm 27 so as to stop the carrier 55.

The bracket 47 is attached to the carrier 50, and the nut 43 is fixed to the bracket 47. The nut 43 is fitted to the screw 44 which is, in turn, connected to the motor 45 such as a servo motor for positioning purposes.

Figure 5:
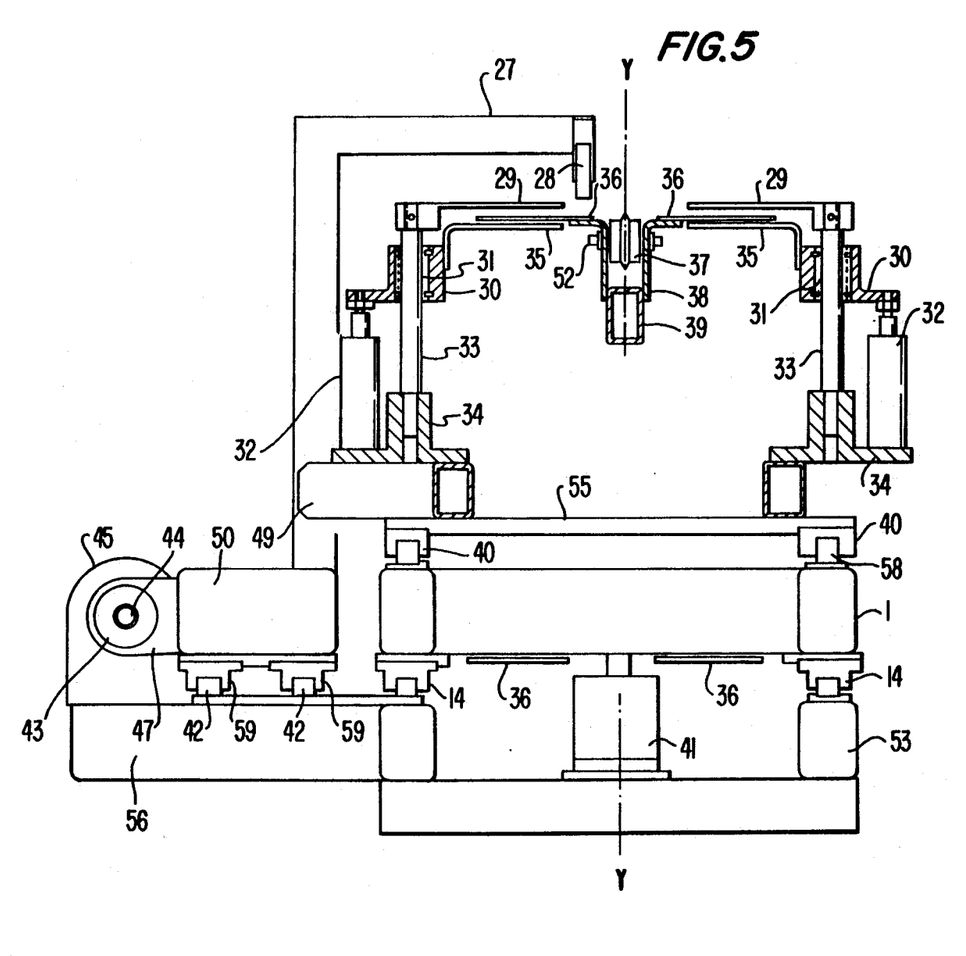
FIG. 5 is a sectional view taken along line A—A of FIG. 1.

The rectangular pipe 39 extends centrally of the conveyor. The plates 38 are L-shaped and secured to opposite sides of the pipe 39. The upper side of each plate 38 is configured to support the conveyor belt 36 near the center thereof. The pins 52 are spaced along and extend between the plates 38 so as to rotatably support the guide rollers 37. Each guide roller 37 has a V-shaped projection at its center as shown in FIG. 5.

The arm 26 is fixed to the front portion of the support frame 53 and has a free end to which the reflection-type optical switch 25 is attached.

Figure 6:
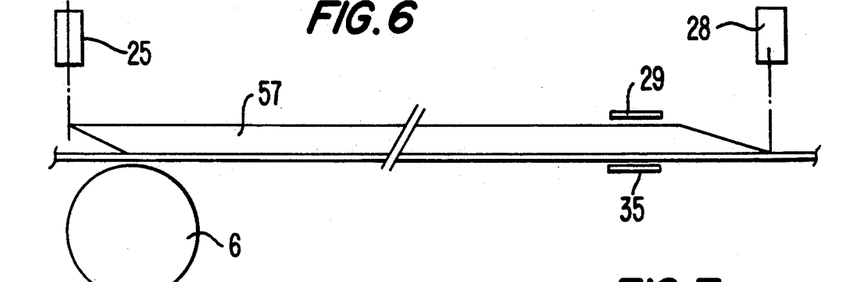
FIG. 6 is a schematic view showing the manner in which a tread is positioned and measured.

An operator places a tread 57 on the conveyor to effect lateral positioning of a central groove of the tread 57 relative to the projections of the guide rollers 37, or to bring the central groove of the tread 57 into alignment with the projections of the guide rollers 37. The conveyor is then moved back and forth and is stopped when the forward end of the tread 57 is brought into alignment with the front switch 25. The rear switch 28 is driven by the motor 45 to detect the rear end of the tread 57. At this time, the actual length of the tread is measured.

After the tread has been positioned, and the actual length of the tread has been measured, the pneumatic cylinders 32 are actuated to drive the fingers 35. The fingers 35 then cooperate with the fingers 29 to grip the tread 57. The optical switch 28 and the fingers 29 and 35 are held in position since the the arm 27 is in contact with the stopper 49 mounted to the carrier 55.

Figures 7, 8:
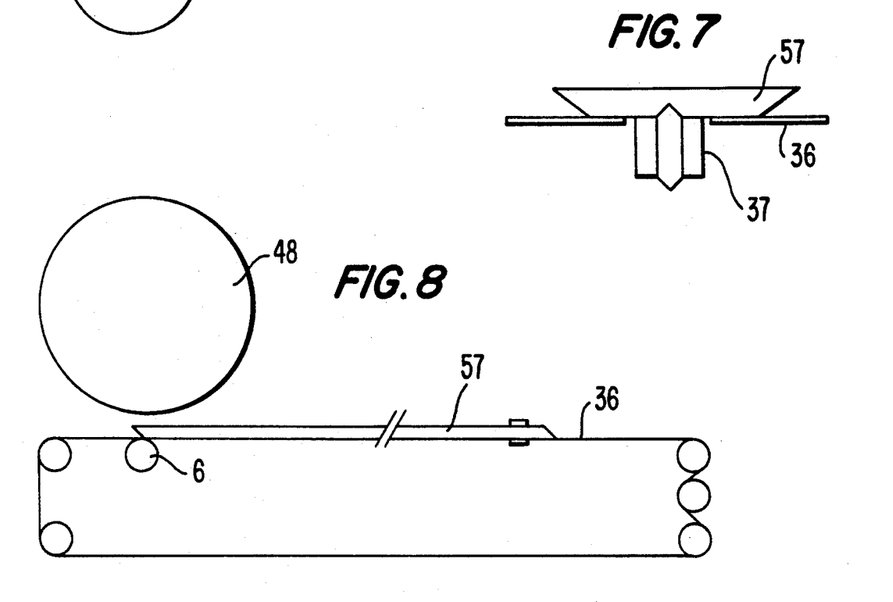
FIG. 7 is a schematic view showing the manner in which the tread is aligned.
FIG. 8 is a side view of the tread immediately before it is rolled to commence joining.

The pneumatic cylinder 41 is then actuated to move the conveyor in a forward direction and to stop the same when the press roller 6 is located right below the drum 48.

The press roller 6 is thereafter pivoted to press and stick the tread 57 against the drum 48. At this time, the drum 48 and the conveyor 36 are rotated at such a speed as to bring the front and rear ends of the tread 57 into alignment with one another. Such speed of the conveyor 46 is represented by the following equation.

$$v = V \times \frac{l_1 - l_2}{L}$$

where L (mm) is the circumference of the drum, $l_1$ (mm) is the actual length of the tread, $l_2$ (mm) is the length of a skived end of the tread V (mm/sec) is the speed of rotation of the drum, and v (mm/sec) is the speed of the conveyor.

Figure 9:
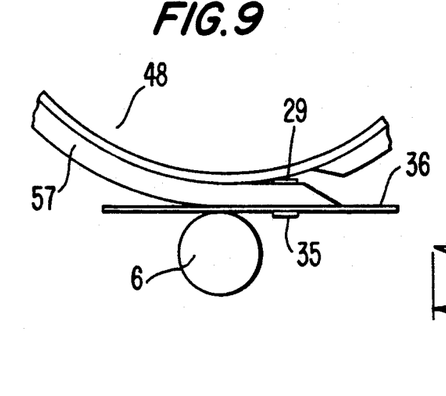
FIG. 9 is a side view of the tread immediately before opposite ends of the tread are joined together.
Figure 10:
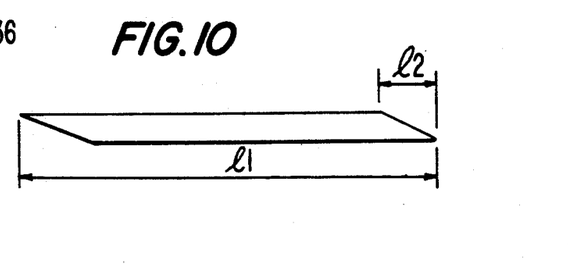
FIG. 10 is a side view of the tread.

As shown in FIG. 9, the fingers 29 and 35 release the tread 57 immediately before the tread 57 is once wrapped and are then retracted while the wire 51 is being taken up by the motor 18.

In the illustrated embodiment, the belt conveyor is used. Alternatively, a circulating type roller conveyor may be used. In such a case, a conveyor roller, rather than the guide rollers, includes the guide projection. Also, the carrier with the fingers, rather than the roller conveyor, may be driven by a ball screw or the like, and the roller conveyor follows.

Second Embodiment

In FIGS. 11 to 14, similar components are designated by the same reference numerals employed in the first embodiment.

Figure 11:
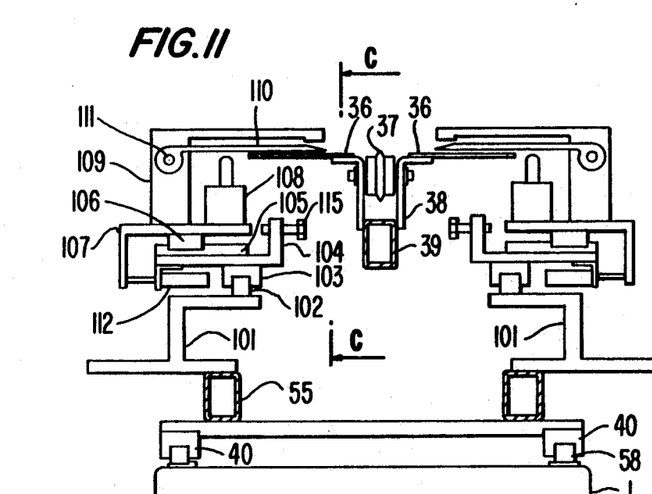
FIG. 11 is a sectional view of an apparatus according to a second embodiment of the present invention.
Figure 12:
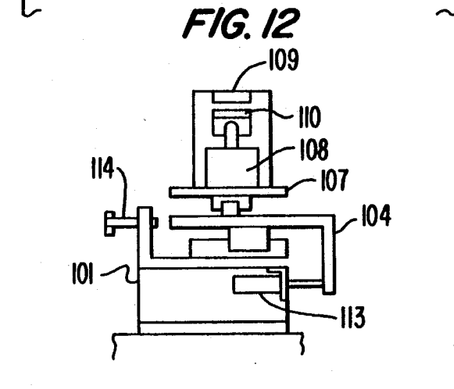
FIG. 12 is a sectional view taken along line C—C of FIG. 11.

Brackets 101 are mounted to the carrier 55. Rails 102 are mounted on the brackets 101. Stopper bolts 114 are mounted to the brackets 101. Slide bearings 103 are provided on corresponding carriers 104. Rails 105 are mounted on the carriers 104. Slide bearings 106 are mounted to carriers 107. Pneumatic cylinders 108 are mounted to the carriers 107. Stopper bolts 115 are mounted to the carriers 104. Pneumatic cylinders 113 are mounted to the brackets 101, while pneumatic cylinders 112 are mounted to the carriers 104. Clamps 109 are mounted to the carriers 107.

Pins 111 are secured to the clamps 109. Fingers 110 are rotatable about the pins 111. The members 101 to 115 are symmetrically arranged with respect to the center of the conveyor frame 1.

The operation of the apparatus will now be described.

Figure 13:
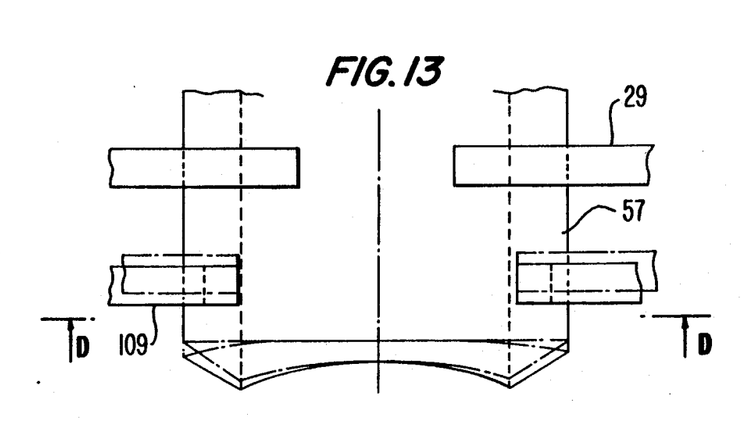
FIG. 13 is a diagrammatic view showing the manner in which the rear portion of the tread is locally deformed.
Figure 14:
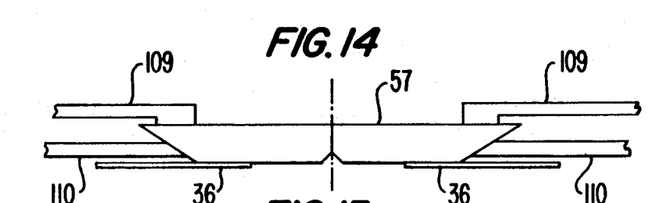
FIG. 14 is a sectional view taken along line D—D of FIG. 13.

The actual length of the tread 57 is first measured. The tread 57 is then gripped by the fingers 29. Thereafter, the pneumatic cylinders 112 are operative to move the clamps 109 and the fingers 110 toward the center of the conveyor. The pneumatic cylinders 108 are then actuated to rotate the fingers 110 about the pins 111 to thereby grip opposite sides of the tread 57. The movement of the clamps 109 and the fingers 110 are adjusted or limited by the stoppers 115. The pneumatic cylinders 113 are then actuated to move the clamps 109 and the fingers .0 so as to stretch the tread extend to and The stopper bolts 114 are used to limit movement of the carriers 104 so as to adjust the which the tread is stretched. The clamps 109 and the fingers 110, like the fingers 29 and 35, release the tread 57 immediately before the tread is wrapped once around the drum 48. The front and rear ends of the tread 57 can be accurately joined together by adjusting the ends of the tread depending on materials, mixing conditions, and shapes.

The advantages of the present invention are as follows:

(1) In accordance with the present invention, a method for joining opposite ends of a tread in an apparatus for making a tire, comprises the steps of:
measuring an actual length of a tread;
attaching a front end of the tread to a drum and fixing a rear end of the tread to a conveyor;
adjusting the speed of rotation of the conveyor and the drum as follows:

$$v = V \times \frac{l_1 - l_2}{L}$$

where L (mm) is the circumference of the drum, 11 (mm) is the actual length of the tread, 12 (mm) is the length of a skived end of the tread, V (mm/sec) is the speed of rotation of the drum, and v (mm/sec) is the speed of the conveyor; and
joining the front and rear ends of the tread together. By this method, the opposite ends of the tread can automatically and evenly or accurately be joined on the drum.

Also, the operator is no longer required to manually stretch and join the ends of the tread.

(2) After the actual length of the tread has been measured, the opposite ends of the tread are gripped. A machine is used to stretch the rear end of the tread so as to join the opposite ends of the tread together. In this way, the ends of the tread can be adjusted in conformity with materials of the tread, mixing conditions, and shapes before it is wrapped.

Accordingly, the amount of work by the operator can be reduced or completely avoided.

Although there have been described what are at present considered to be the preferred embodiments of the invention, it will be obvious to those skilled in the art that changes and modifications may be made therein without departing from the invention, and, therefore, it is intended that the appended claims cover all such changes and modifications as fall within the spirit and scope of the invention.

What is claimed is:

1. Apparatus for joining opposite ends of a tread in a tire making machine, said apparatus comprising:
a rotatable drum around which a tread is to be wrapped in the apparatus;
a conveyor upstream of said drum in the apparatus, said conveyor including two lateral endless loops and a guide interposed between said loops so as to maintain a tread placed on the endless loops of the conveyor in position relative to the conveyor;
clamping means for clamping opposite sides of a tread placed on the conveyor to said lateral endless loops of the conveyor, respectively;
a drive motor connected to the endless loops of said conveyor so as to drive said loops; and a carrier on which said clamping means is supported, said carrier being movable in the apparatus in the longitudinal direction of said conveyor such that when said clamping means clamps opposite sides of a tread placed on the conveyor to said endless loops and said endless loops are driven by said drive motor, said carrier and the clamping means mounted thereto are moved in the longitudinal direction of the conveyor.

2. Apparatus for joining opposite ends of a tread in a tire making machine as claimed in claim 1, and further comprising measuring means for measuring the length of a tread disposed on the conveyor.

3. Apparatus for joining opposite ends of a tread in a tire making machine as claimed in claim 2, wherein said measuring means comprises first and second optical detectors.

4. Apparatus for joining opposite ends of a tread in a tire making machine as claimed in claim 3, wherein said first optical detector is fixed in position in the apparatus above said conveyor, and said second optical detector is supported above said conveyor, and further comprising positioning means for moving said second detector longitudinally relative to said conveyor, and shifting means for shifting said conveyor longitudinally in its entirety in the apparatus.

5. Apparatus for joining opposite ends of a tread in a tire making machine as claimed in claim 1, and further comprising shifting means for shifting said conveyor longitudinally in its entirety in the apparatus.

6. Apparatus for joining opposite ends of a tread in a tire making machine as claimed in claim 5, wherein said conveyor includes a frame on which said lateral endless loops are supported, and said shifting means is a hydraulic cylinder connected to said frame.

7. Apparatus for joining opposite ends of a tread in a tire making machine as claimed in claim 1, and further comprising gripping means for gripping opposite sides of a tread placed on the conveyor and for moving relative to the loops of the conveyor so as to stretch opposite sides of the rear end of the tread to the front end of the tread when the tread is wrapped around said drum to thereby bring the front and rear ends of the tread together at the opposite sides thereof.

8. Apparatus for joining opposite ends of a tread in a tire making machine as claimed in claim 1, and further comprising measuring means for measuring the length of a tread disposed on the conveyor, said measuring means including a first optical detector fixed in the apparatus above said conveyor, a second optical detector supported above said conveyor, and positioning means for moving said second detector longitudinally relative to said conveyor, the length of a tread disposed only on said conveyor being measurable by aligning one end of the tread with said first optical detector and positioning said second optical detector over the other end of said tread with said positioning means, and said optical detectors being operatively connected to said drum and said conveyor such that speeds of the drum and the conveyor are controllable based on the length of a tread measured by said measuring means.

9. Apparatus for joining opposite ends of a tread in a tire making machine as claimed in claim 7, and further comprising measuring means for measuring the length of a tread disposed on the conveyor, said measuring means including a first optical detector fixed in the apparatus above said conveyor, a second optical detector supported above said conveyor, and positioning means for moving said second detector longitudinally relative to said conveyor, the length of a tread disposed only on said conveyor being measurable by aligning one end of the tread with said first optical detector and positioning said second optical detector over the other end of said tread with said positioning means, and said optical detectors being operatively connected to said drum and said conveyor such that speeds of the drum and the conveyor are controllable based on the length of a tread measured by said measuring means.

* * * * *